April 15, 1924.
F. S. DUESENBERG
FLUID PRESSURE BRAKE SYSTEM
Filed Nov. 16, 1920    5 Sheets-Sheet 4
1,490,163
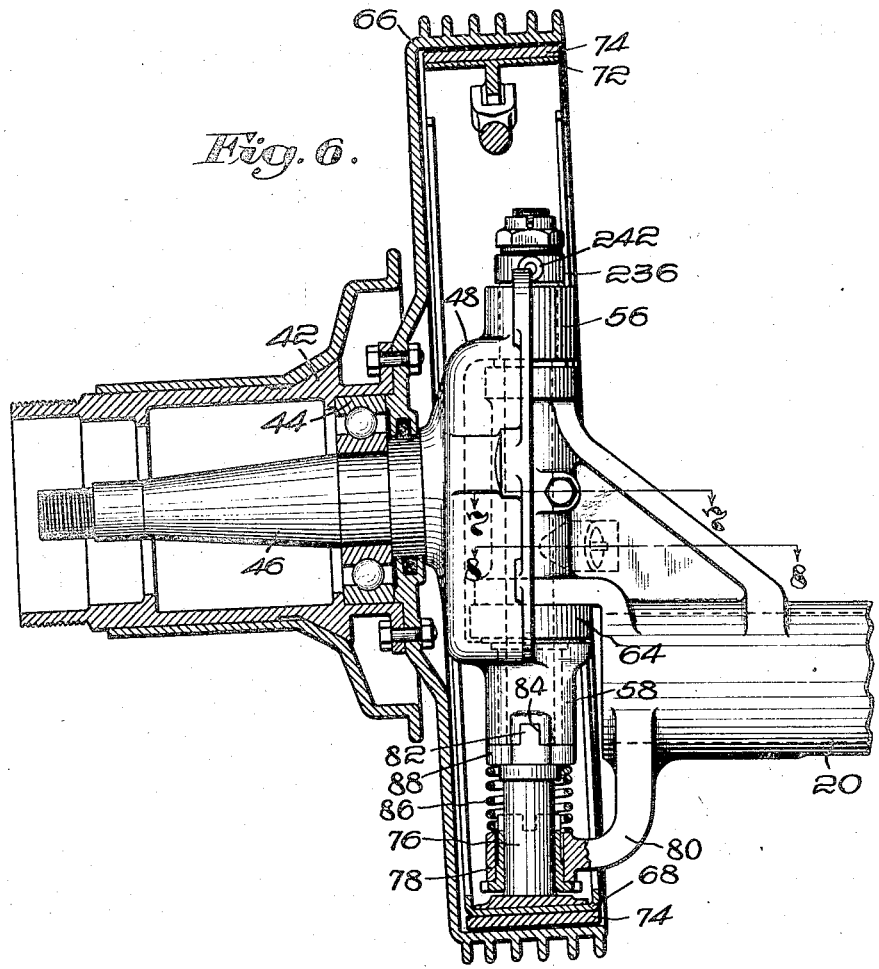
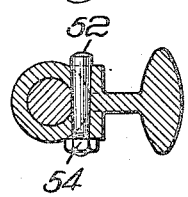
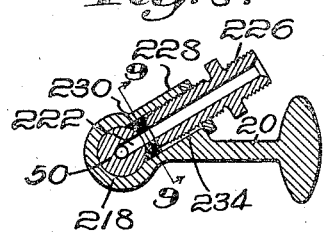
Inventor:
Frederick S. Duesenberg.
by Emery, Booth, Janney & Varney
Attys.

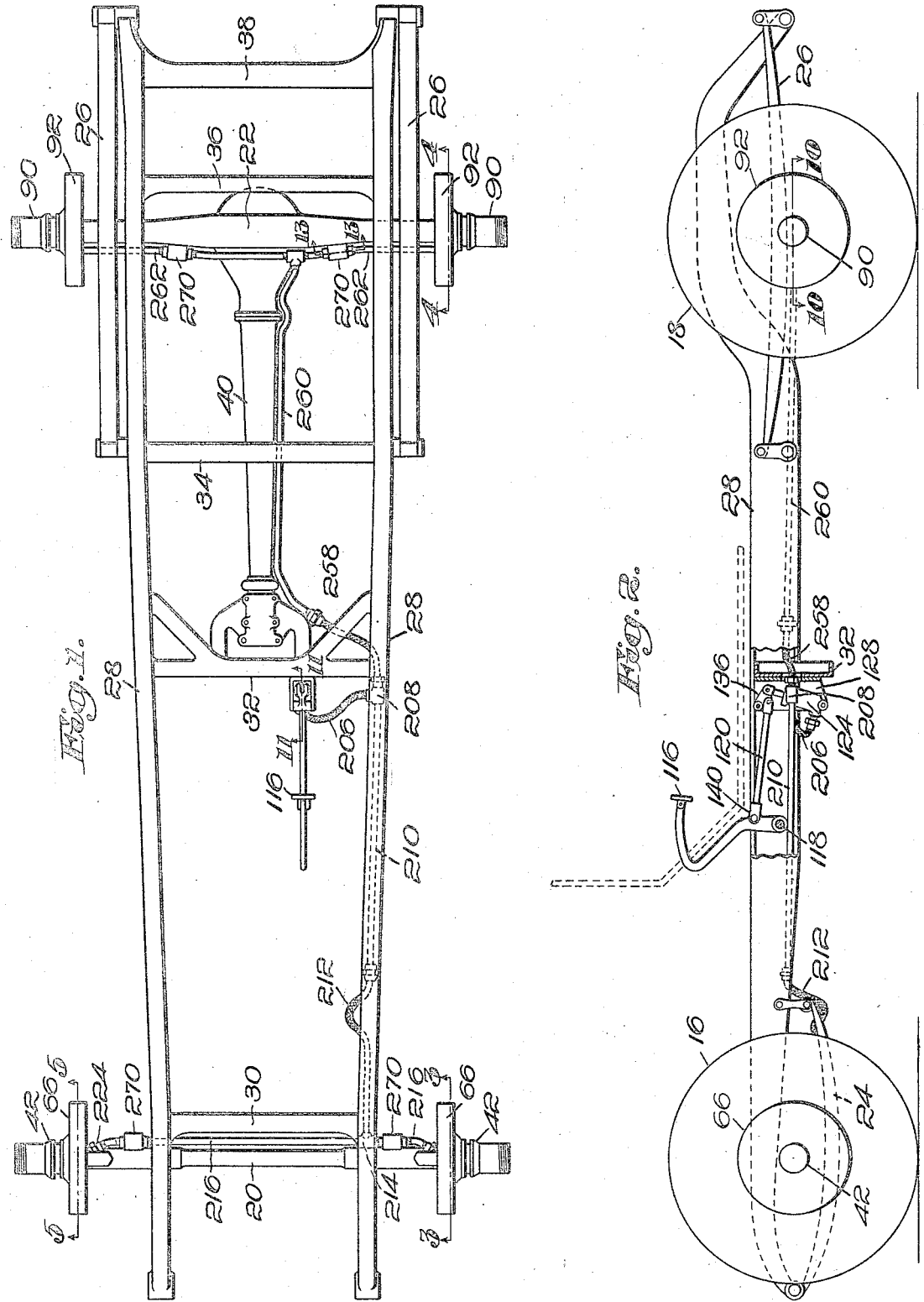

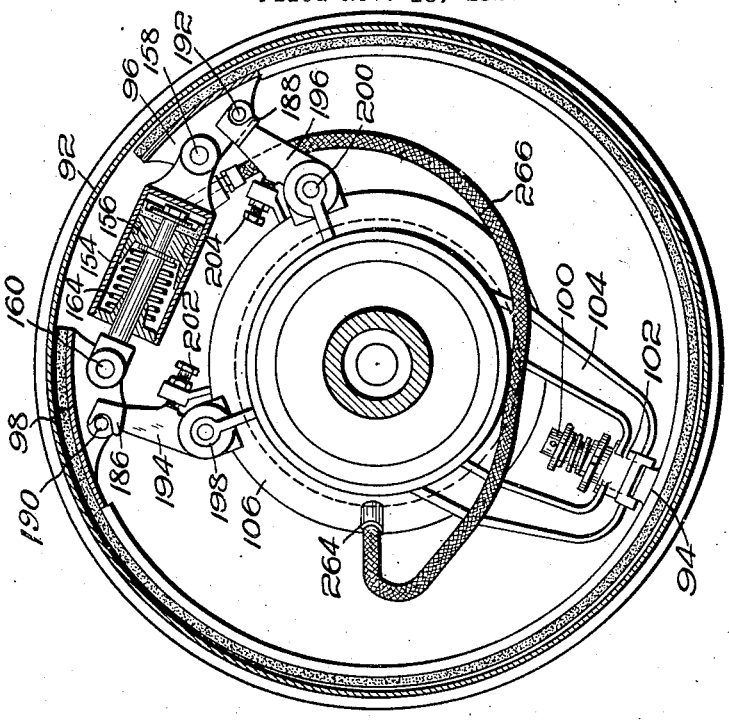
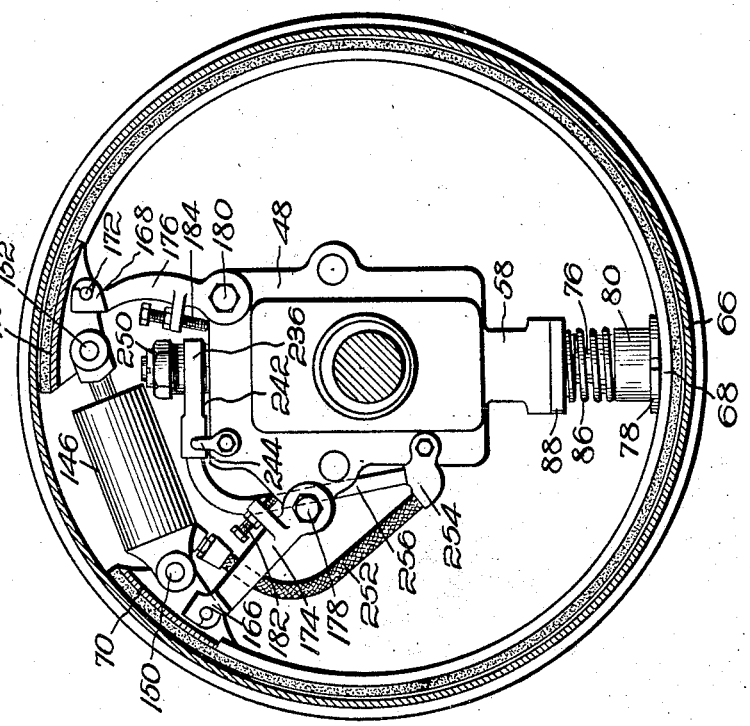

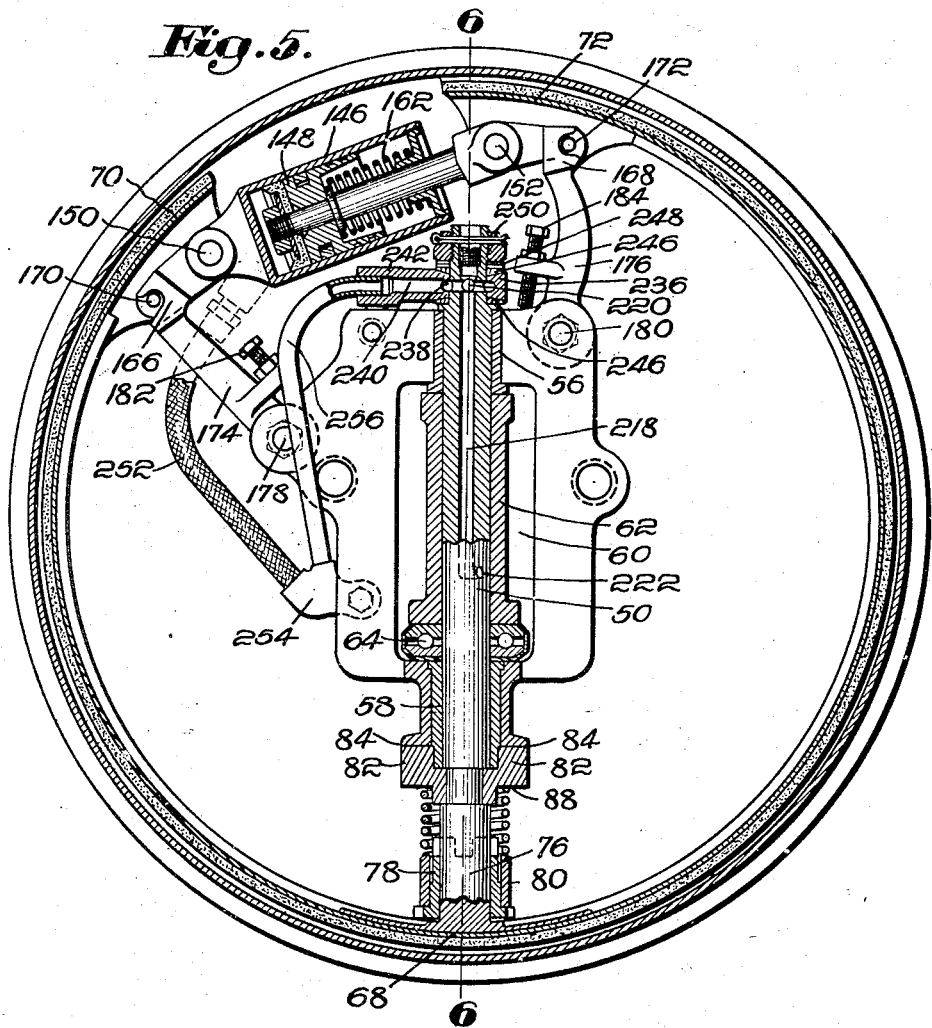

April 15, 1924.
F. S. DUESENBERG
1,490,163
FLUID PRESSURE BRAKE SYSTEM
Filed Nov. 16, 1920 — 5 Sheets-Sheet 5
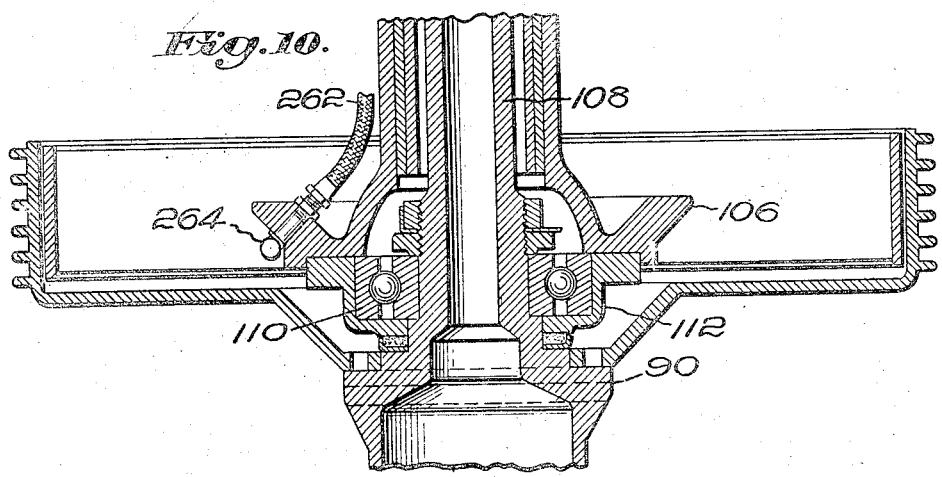
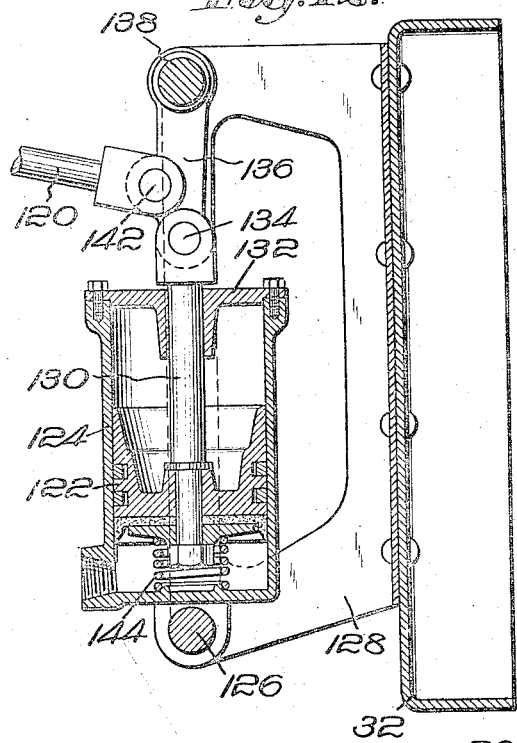
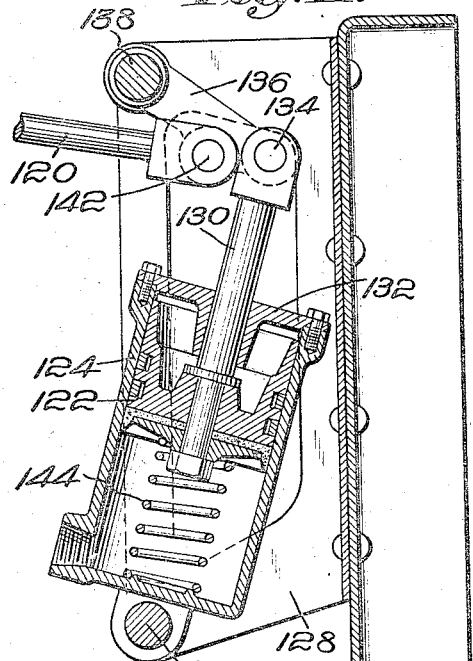
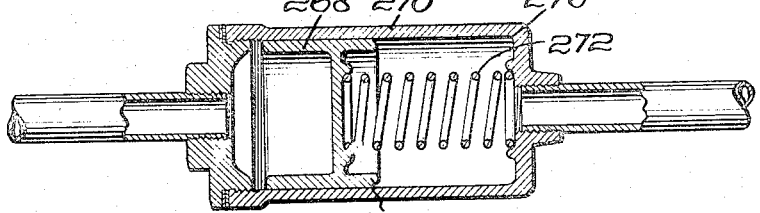
Inventor:
Frederick S. Duesenberg Patented Apr. 15, 1924.

1,490,163

UNITED STATES PATENT OFFICE.

FREDERICK S. DUESENBERG, OF ELIZABETH, NEW JERSEY.

FLUID-PRESSURE BRAKE SYSTEM.

Application filed November 16, 1920. Serial No. 424,496.

*To all whom it may concern:*

Be it known that I, FREDERICK S. DUESENBERG, a citizen of the United States, and a resident of Elizabeth, county of Union, and State of New Jersey, have invented an Improvement in Fluid-Pressure Brake Systems, of which the following description, in connection with the accompanying drawings, is a specification, like characters on the drawings representing like parts.

This invention relates to fluid pressure brake systems, and is more especially concerned with a system having special utility in connection with steerable vehicles, such as motor cars, and particularly those whose front or steering wheels, as well as the rear or driving wheels, are equipped with brakes.

My invention will be best understood by reference to the following description, when taken in connection with the accompanying drawings of one illustrative embodiment thereof, while its scope will be more particularly pointed out in the appended claims.

In the drawings:

Fig. 1 is a plan of a motor car chassis equipped with a brake system exemplifying my invention;

Fig. 2 is a side elevation of the same, partly in vertical section;

Fig. 3 is a detail sectional view on an enlarged scale on line 3—3 of Fig. 1;

Fig. 4 is a detail sectional view on an enlarged scale on line 4—4 of Fig. 1;

Fig. 5 is a sectional view on an enlarged scale on line 5—5 of Fig. 1;

Fig. 6 is a sectional view on line 6—6 of Fig. 5;

Fig. 7 is a detail sectional view on line 7—7 of Fig. 6;

Fig. 8 is a detail sectional view on line 8—8 of Fig. 6;

Fig. 9 is a detail sectional view on line 9—9 of Fig. 8;

Fig. 10 is a sectional view on an enlarged scale on line 10—10 of Fig. 2;

Fig. 11 is a detail sectional view on an enlarged scale on line 11—11 of Fig. 1, showing the parts in their normal positions;

Fig. 12 is a sectional view similar to Fig. 11, showing the parts in another position; and Fig. 13 is a detail sectional view on line 13—13 of Fig. 1.

Referring to the drawings, and to the embodiment of my invention which I have selected for exemplification, there is shown in Figs. 1 and 2 a portion of the chassis of a motor vehicle minus the motor, clutch, transmission, and part of the steering mechanism.

The chassis has a pair of front steering wheels 16 and rear driving wheels 18, conventionally represented in Fig. 2, front and rear axles 20 and 22, front and rear springs 24 and 26, and a spring-supported frame, the latter herein comprising a pair of side members 28 connected by cross members 30, 32, 34, 36 and 38. Herein, a torque tube 40, secured to the rear axle, is pivotally connected at its front end to the cross-member 32. All the parts thus far described may be of any usual or suitable construction.

I will now describe a part of the steering mechanism, reference being had to Figs. 5 and 6, more particularly the latter. Referring to Fig. 6, each of the front wheels may be provided with any usual hub 42, mounted to turn on bearings, one of which is shown at 44 on a stub axle or spindle 46, herein formed as a part of a steering knuckle 48, the latter being suitably pivoted on the axle 20, as by the provision of a pivot 50 (see Fig. 5), herein secured to the axle by a tapered pin 52 and nut 54 (see Fig. 7). The steering knuckle is herein provided with upper and lower bearings 56 and 58, and has intermediate these bearings a recess 60, which receives a boss 62 formed on the end of the axle 20. Herein this boss rests on a ball thrust bearing 64, which contributes to the ease of steering of the vehicle.

Suitably secured to the wheel hub is a brake-drum 66, and enclosed by the latter is a brake-shoe, or shoes, herein exemplified by a brake-band 68 having terminals 70 and 72 which, though herein forming a part of a single band, are in effect the mechanical equivalents of distinct brake-shoes. The brake-band is herein provided with a usual brake lining 74.

Since the brake-drum turns with the steering knuckle, the brake-band, in order to remain at all times in cooperative relationship therewith, must also turn in unison with the brake-drum. Another requirement is that the lower part of the brake-band shall not drag on the internal surface of the brake-drum when the brakes are released. Turning movement of the brake-band in unison with the brake-drum is herein ensured by the provision of a brake-band support 76, which is mounted to turn in a bearing 78 on an ear 80 formed on the axle 20. The lower end of this support is suitably secured to the brake-band, while the upper end is coupled to the steering knuckle, as by a coupling herein comprising a pair of tongues 82 received in grooves 84 provided in the lower end of the steering knuckle. The support 76 can move up and down within reasonable limits accompanying expansion or contraction of the brake-band, while still causing the latter to turn with the steering knuckle. A suitable spring 86, herein helically coiled about the intermediate portion of the support 76, bears at one end against an abutment 88 on the latter, and at its other end against the ear 80 on the axle, thereby constantly exerting a lifting effect on the lower part of the brake-band, and preventing the latter from dragging when released.

I will now describe the rear wheel brakes, reference being had to Figs. 4 and 10. Each of the rear wheels is provided with a hub 90 (see Fig. 10), to which is suitably secured a brake-drum 92. The latter encloses one or more, herein a pair of brake-shoes conveniently formed as parts of a brake-band 94 having terminals 96 and 98. The lower or intermediate part of the brake-band is carried by a movable support 100, herein mounted to slide in a guide 102 in a yoke-like support 104 suitably formed on or secured to the housing of the rear axle. Herein, the latter is provided with an annular flange 106, on which the yoke 104 is formed. The wheel is driven in any usual manner, as by a shaft 108 mounted to turn in a suitable bearing 110 within a cap or cover 112 appropriately secured to the flange 106 (see Fig. 10). The support 100 is yieldingly mounted in a manner similar to the support for the brake-band of the front wheel, as by a spring 114 (see Fig. 4). The parts of the rear brakes as thus far described are, or may be, of any usual or suitable construction.

The invention contemplates the use of a suitable fluid, such as oil, for the operation of all four brakes under the control of a single actuating member conveniently located for operation by the driver. In the present example, the actuating member is a pedal 116 (see Fig.. 2), fulcrumed on a pivot 118, and suitably connected as by a link 120 with a master piston 122 working in a master cylinder 124. The piston and cylinder are pivotally mounted so as to swing to and fro accompanying reciprocation of the piston in the cylinder, and in the present example, the latter is mounted on a pivot 126 in a yoke-like bracket 128 appropriately secured to the cross-member 32 of the frame.

The piston is herein provided with a piston-rod 130, guided by a cylinder head 132 secured to the upper end of the cylinder. The upper end of the piston-rod is pivotally connected at 134 to a lever 136, the latter being fulcrumed at 138 on the bracket 128. The link 120 is pivoted at 140 to the pedal 116, and at 142 to the lever 136, preferably at a point adjacent the pivot 134. The lever 136, piston-rod 130, piston 122, and cylinder 124, constitute in effect a toggle, which straightens as the piston descends in the cylinder (see Fig. 12), and the relative arrangement of the parts is such as to cause a relatively rapid expulsion of the fluid at the commencement of the downward movement of the piston, and a decreasing speed of expulsion as the piston continues to descend. This is due to the fact that the lever 136 is in the nature of a crank, which approaches a dead center as the piston descends. This means that when the brake pedal is depressed, at first the brakes will move rapidly but with comparatively slight power, but as the movement progresses, the brakes will be applied with increasing force. A suitable spring 144, herein interposed between the bottom of the cylinder and the piston, constantly tends to urge the latter in an upward direction, and to restore the pedal and connected parts to the initial position represented in Figs. 2 and 11.

The master cylinder controls two sets of brake cylinders, one set for the front wheels and one for the rear. Referring to Fig. 5, each of the front wheel brakes is provided with a brake cylinder 146, having a piston 148 working therein, one pivotally connected at 150 to one of the brake terminals 70, and the other pivotally connected at 152 to the other brake terminal 72. Similarly, each of the rear wheel brakes (see Fig. 4) is provided with a brake cylinder 154 and a piston 156 working therein, one pivotally connected at 158 to the brake-band terminal 96, and the other pivoted at 160 to the other brake-band terminal 98. Thus it is evident that the brake cylinders and pistons are supported jointly by the brake-band terminals, and as they are mounted within the circumferential limits of the brake-drums, they are afforded protection by the latter, and the brakes moreover present a more sightly appearance. Preferably, the brake cylinders are so arranged that the cylinder heads in which the piston rods are guided are presented in an upward direction and above the body of oil in the cylinder. In the present example, the cylinders are inclined as shown in Figs. 3 and 4. This arrangement is preferable because, since the level of the oil is below the upper end of the piston-rod guide, any possible danger of oil leakage is minimized.

The brakes are applied by the introduction of oil or other suitable fluid into the brake cylinders, thereby causing the pistons and cylinders to be forced in opposite directions. The brakes are retracted by suitable springs 162 and 164, herein interposed between the pistons and the adjacent ends of the cylinders. Preferably, suitable stops are provided to limit the movement of the brakeband terminals toward their released position (in the present example, toward each other), and to this end, I have herein provided the front wheel brakes with stops 166 and 168, cooperating with pins 170 and 172 carried by the brake-band terminals 70 and 72, respectively. Herein, these stops are adjustably mounted so that, as the brakedrums and bands wear, adjustment of the stops may be made from time to time, thereby to preserve a certain travel of the brake connections. To this end, the stops are herein carried by levers 174 and 176, mounted on pivots 178 and 180, and provided with adjustable set-screws 182 and 184, by means of which the swinging movement of the levers toward each other may be adjustably limited. Similarly, the rear brakes are provided with stops 186 and 188, cooperating with pins 190 and 192 carried by the brakeband terminals. The stops are carried by levers 194 and 196, pivoted at 198 and 200, and provided with adjustable set-screws 202 and 204, by means of which the stops may be adjusted in a manner similar to that of the front wheel brakes.

The connection between the master cylinder and the brake cylinders will now be described, reference being had at first to Figs. 1 and 2. Leading from the bottom of the master cylinder is a conduit 206, herein flexible to permit free swinging movement of the master cylinder. This conduit is connected on the one hand to the front wheel brakes, and on the other hand to the rear wheel brakes. Referring first to the front wheel brakes, the conduit 206 is herein extended laterally to a T-fitting 208, supported on one side of the side frame members 28, and communicating with a conduit 210 extending in a forward direction along the frame. This conduit may be rigid, as no movement is required of it. At its forward end, this conduit is connected to a flexible conduit 212, having its forward end carried by the front axle, and suitably arranged to permit the axle and frame to move up and down, one with relation to the other. One convenient way of accomplishing this is to carry the flexible conduit along the top of one of the front springs 24, and to provide a sufficient slack of the conduit adjacent the rear end of the spring, as represented in Fig. 2.

The front end of the conduit 212 is connected by a T-fitting 214 with two branch conduits 216 supported by and extending longitudinally along the back of the front axle. It should here be remembered that the brake cylinders are carried by the steering knuckles, and that swinging movement of the latter is accompanied by a corresponding movement of the former. However, the connections between the branch conduits and the brake cylinders should be such as to permit turning movement of the steering knuckles without the necessity of corresponding bending of flexible conduits. To this end, therefore, I have provided novel connections, including hollow pivots for the steering knuckles.

The connections will now be described, reference being had at first to Fig. 5. The pivot 50 is herein provided with an axial passage 218, as well as upper and lower radial passages 220 and 222. The latter is suitably connected with the branch conduit 216, as by a coupling 224 (Fig. 1) and a nipple 226 (Fig. 8) the latter being threaded into a boss 228 provided on the axle 20. The bore of the nipple is coaxially aligned, and communicates, with the radial passage 222, and to prevent leakage at the point where they are connected with each other, I have herein provided a soft metal washer 230, which may be made of lead, shaped on one side to fit the circumferential surface of the pivot, and on the other side to fit the end of the nipple. This washer may be compressed and squeezed into the cavity and against the abutting surfaces by simply turning the nipple in the proper direction. While the cylindrical shape of the pivot might be relied upon to prevent the washer from rotating as the nipple is turned, I prefer to provide the washer with a projecting key 232 received in a keyway 234 provided in the boss 228, as clearly shown in Fig. 9.

It will be remembered that the pivot pin 50 is secured against turning movement with respect to the axle, and turns in bearings provided in the steering knuckle. This being so, it must be evident that provision should be made for relative turning movement between the pivot and the connections leading from the latter to the brake cylinder. To this end, I have herein provided a swivel 236 shown at the upper portion of Fig. 5, which has a part encircling and mounted to turn about the pivot, and is provided with a circumferential groove 238 communicating with one or more, preferably a plurality, of the radial passages 220 in the pivot, thereby affording communication at all times between the interior of the pivot and a passage 240 in an arm 242 which is fixedly secured to the steering knuckle, as by a clip 244 (see Fig. 3). A non-leaking joint between the swivel and pivot is ensured by appropriate means, herein compressible washers 246 above and below the swivel, a spring washer 248 superimposed upon the upper washer 246, and a nut 250 threaded onto the pivot and serving to place the washers under compression.

Suitable connection is made from the swivel to the brake cylinder, and as the latter moves to and fro during the operation of the brake, it is evident that the connection should be flexible,—in part at least. To this end, I have herein provided a flexible conduit 252 attached at one end to the brake cylinder, and suitably connected at its other end to the swivel as by an elbow 254 and rigid conduit 256. The location of the elbow is such that but slight bending movement is required of the flexible conduit,—hence, there is little likelihood of its becoming injured owing to the bending action.

The connections leading from the master cylinder to the rear wheel brake cylinders will now be described, reference being had at first to Figs. 1 and 2. Owing to the fact that there is relative vertical movement between the frame and the rear axle, it is evident that these connections must be, in part at least, flexible, and to this end, I have herein provided a flexible conduit 258 leading from the T-fitting 208 and connected to the rigid conduit 260 which is carried by the torque tube 40. It will be remembered that the latter is pivoted at its forward end to the frame, and is rigidly attached at its rear end to the rear axle. Hence it moves up and down with the latter. Leading from the conduit 260 are two branches 262, each suitably connected to its brake cylinders as by an elbow 264 (see Fig. 10), and a flexible conduit 266 leading from the latter to the brake cylinder. Herein, the elbow is attached to the flange 106 of the rear axle, and extends therethrough as shown at the left-hand side of Fig. 10, while the flexible conduit extends beneath and part-way around the axle, and leads to the brake cylinder at a point best calculated to permit movement of the brake cylinder, without undue bending of the conduit, as will be evident from an examination of Fig. 4.

The general operation of the brake system should be evident from the foregoing, without further description, except to say that the brakes are applied by depressing the pedal, which causes the master piston to descend and expel the fluid from the master cylinder through the described connections to the brake cylinders. When the pressure is removed from the brake pedal, the parts are restored to their initial positions by the action of the springs acting on the pistons of the several cylinders. It should now be evident that the fluid system ensures equalization of action of all four brakes, thus minimizing any danger of skidding of the vehicle when the brakes are applied.

In the event of any serious leakage from one of the brake cylinders due to any cause, such as the bursting of the flexible connection leading thereto, provision may be made for automatically limiting the fluid loss to that particular brake, thus preventing the entire brake system from going out of commission. One convenient way of accomplishing this is by the use of suitable pressure-responsive means interposed in the branches 216 and 262 between the brake cylinders and the connections leading to the master cylinder. In the present example, I have shown for this purpose pressure-responsive means comprising a piston 268 working in the cylinder 270 (see Fig. 13), having its ends connected to two parts of such branch. A light spring 272 constantly tends to urge the piston toward the master cylinder. During the normal operation of the system, the piston moves idly to and fro, and simply transmits the fluctuations of pressure from one side to the other side thereof, thus causing the brakes to be operated just as if the piston were not present. While the piston might be made a close working fit in the cylinder, this would necessitate a separate filling of the connections outwardly beyond the piston, and I prefer to make the piston a comparatively loose working fit in the cylinder, so that there will be interchange of the fluid past the piston during the normal operation. When, however, there is any great dropping of pressure outwardly beyond the piston 268, the latter may be caused to shut off that particular branch, as by the use of a valve 274 suitably carried by the piston, and co-operating with a seat 276 at the outer end of the cylinder. When, therefore, there is a tendency toward an abnormal difference of pressure on opposite sides, respectively, of the piston,—that is to say, when the pressure on the outer side is very much less than that on the inner, the light spring yields and the piston carries the valve against its seat, thereby completely closing the branch and preventing any loss of oil except that which is outwardly beyond the valve. This being so, the remaining brakes will continue to operate as before. The danger of any such failure of one of the brakes, due to excessive leakage, is very remote, however, and if desired, the described automatic shut-off device may be omitted.

No claim is made herein to that portion of the invention which comprises the automatic check or shut-off (shown in Fig. 13) in combination with a fluid brake system, this being the subject matter of my divisional application Serial No. 697,500, filed March 7, 1924 for "Pressure-fluid brake systems."

Having thus described one embodiment of my invention, but without limiting myself thereto, what I claim and desire by Letters Patent to secure is:

1. In a brake system, the combination with a brake and its operating fluid motor, of a generally upright master cylinder having a piston working therein, conduit means connecting the lower portion of said master cylinder with said operating fluid motor, and actuating means for relatively moving said master piston and cylinder to cause the expulsion of fluid therefrom to said brake operating cylinder, said actuating means including a crank-pin which approaches a dead center as said piston approaches the end of its working stroke in expelling fluid from said master cylinder.

2. In a brake system, the combination with a brake and its operating fluid motor, of a generally upright master cylinder having a piston working therein, conduit means connecting said master cylinder with said operating fluid motor, actuating means for relatively moving said master piston and cylinder to cause the expulsion of fluid therefrom to said brake operating fluid motor, said actuating means including a crank-pin which approaches a dead center as said piston approaches the end of its working stroke in expelling fluid from said master cylinder, and a pivotal mounting on which said master cylinder and piston swing under the influence of said actuating means, the relative arrangement of said master cylinder and piston, their mounting and actuating means being such as to cause a relatively rapid expulsion of the fluid at the commencement of the movement of said actuating means and a decreasing speed of expulsion as the operation of said actuating means progresses.

3. In a brake system, the combination with a brake and its operating fluid motor, of a generally upright master cylinder and piston, a pivotal mounting for said master cylinder and piston, and actuating means for said master cylinder and piston, including a lever pivotally connected to said piston above the pivotal axis of said master cylinder.

4. In a brake system, the combination with a brake and its operating fluid motor, of a master cylinder and piston, a pivotal mounting for said master cylinder and piston, and actuating means for said master cylinder and piston, including a lever pivotally connected to said master cylinder and piston and forming therewith a toggle which straightens as the braking movement progresses.

5. In a brake system, the combination with a brake and its operating fluid motor, of a master fluid motor, a pivotal mounting for said master fluid motor, and actuating means for said master fluid motor, including a lever pivotally connected thereto and forming therewith a toggle which straightens as the braking movement progresses.

6. In a brake system, the combination with a brake and its operating fluid motor, of a master fluid motor, and actuating means for said master fluid motor including a crank-pin which approaches its dead center as said master fluid motor approaches the condition of maximum fluid expulsion therefrom toward said operating fluid motor.

7. In a vehicle brake system, the combination with a brake and its operating fluid motor, of a master fluid motor, a pivotal mounting for said master fluid motor, and actuating means for said master fluid motor including a crank, which, together with said master fluid motor, constitutes a toggle which straightens in a forward direction during the expulsion of fluid from said master fluid motor, and a brake lever connected to said toggle and moving in a forward direction as said toggle straightens in a forward direction.

8. In a vehicle brake system, the combination with a brake and its operating fluid motor, of a master fluid motor, a pivotal mounting for said master fluid motor, and actuating means for said master fluid motor including a crank, which, together with said master fluid motor, constitutes a toggle which straightens in a forward direction during the expulsion from said master fluid motor, a brake lever which moves in a forward direction during its brake-applying movement, and a link connecting said lever with said toggle.

9. In a vehicle brake system, the combination with a brake and its operating fluid motor, of a master fluid motor, a pivotal mounting for said master fluid motor, and actuating means for said master fluid motor including a crank, which, together with said master fluid motor, constitutes a toggle which straightens in a forward direction during the expulsion of fluid from said master fluid motor, a brake lever which moves in a forward direction during its brake-applying movement, and a link connecting said lever with said toggle intermediate the ends of said toggle.

10. In a brake system for vehicles, the combination with a brake and its operating fluid motor, of a pivoted master fluid motor connected to said operating fluid motor, a crank above said master fluid motor and constituting therewith a generally upright toggle which straightens as the fluid is expelled from said master fluid motor to said operating fluid motor, and means for actuating said toggle.

11. In a brake system for vehicles, the combination with a brake and its operating fluid motor, of a pivoted master fluid motor connected to said operating fluid motor, a crank above said master fluid motor and constituting therewith a generally upright toggle which straightens as the fluid is expelled from said master fluid motor to said operating fluid motor, and a brake lever connected to said toggle intermediate the pivotal axes of said crank and said master fluid motor.

12. In a vehicle brake system, the combination with a brake and its operating fluid motor, of a pivoted master fluid motor connected to said operating fluid motor, a crank pivotally connected to said master fluid motor and constituting therewith a toggle which straightens in a forward direction as the fluid is expelled from said master fluid motor toward said operating fluid motor, and a toggle actuating lever which is connected to said toggle and moves in a forward direction as said toggle straightens in a forward direction.

13. In a vehicle brake system, the combination with a brake and its operating fluid motor, of a generally upright toggle comprising a pivoted master fluid motor and a crank pivotetd together between said master fluid motor and the fulcrum of said crank, such pivotal connection approaching a plane containing the fulcra of said master fluid motor and said crank as the fluid is expelled from said master fluid motor toward said operating fluid motor.

14. In a vehicle brake system, the combination with a brake and its operating fluid motor, of a generally upright toggle comprising a pivoted master fluid motor and a crank pivoted together between said master fluid motor and the fulcrum of said crank, such pivotal connection approaching a plane containing the fulcra of said master fluid motor and said crank as the fluid is expelled from said master fluid motor toward said operating fluid motor, and a toggle actuating lever having a portion connected to said toggle and adapted to move in the same general direction as said pivotal connection during such expulsion.

In testimony whereof, I have signed my name to this specification.

FREDERICK S. DUESENBERG.